(12) United States Patent  
Kurtenbach et al.

(10) Patent No.: US 9,116,599 B2  
(45) Date of Patent: Aug. 25, 2015

(54) SYSTEMS AND METHODS FOR VISUALIZING A 3D SCENE USING A FLEXIBLE DISPLAY

(75) Inventors: Gordon Kurtenbach, Toronto (CA); James La Fleur, San Rafael, CA (US)

(73) Assignee: AUTODESK, INC., San Rafael, CA (US)

( * ) Notice: Subject to any disclaimer, the term of this patent is extended or adjusted under 35 U.S.C. 154(b) by 220 days.

(21) Appl. No.: 13/424,228

(22) Filed: Mar. 19, 2012

(65) Prior Publication Data

US 2013/0241921 A1    Sep. 19, 2013

(51) Int. Cl.
   G06T 15/10    (2011.01)
   G06T 15/00    (2011.01)
   G06F 3/0481   (2013.01)
   G06T 15/20    (2011.01)
   G06T 19/00    (2011.01)

(52) U.S. Cl.
   CPC ............ G06F 3/04815 (2013.01); G06T 15/20 (2013.01); G06T 19/00 (2013.01); *G06F 2203/04102* (2013.01); *G06T 2219/016* (2013.01)

(58) Field of Classification Search
   CPC ....................................................... G06T 15/00
   USPC ............................................................ 345/427
   See application file for complete search history.

(56) References Cited

U.S. PATENT DOCUMENTS

| | | | |
|---|---|---|---|
| 2004/0008191 A1* | 1/2004 | Poupyrev et al. | 345/184 |
| 2005/0060661 A1* | 3/2005 | Kawahara et al. | 715/782 |
| 2007/0080960 A1* | 4/2007 | Dayanand et al. | 345/419 |
| 2008/0036761 A1* | 2/2008 | Mazzanti | 345/420 |
| 2009/0219286 A1* | 9/2009 | Wei et al. | 345/424 |
| 2009/0324161 A1* | 12/2009 | Prisco | 385/13 |

* cited by examiner

*Primary Examiner* — Mark Zimmerman  
*Assistant Examiner* — Sohum Kaji  
(74) *Attorney, Agent, or Firm* — Artegis Law Group, LLP (57) ABSTRACT

A system and method for visualizing a 3D scene using a flexible display are disclosed. The 3D scene reflects a model of graphics objects, where each graphics object is represented by 3D primitives such as vertices, lines, or surfaces. A display processor generates a 2D image of the 3D scene using various graphics rendering techniques such as non-linear ray-tracing algorithms. A sensor associated with the flexible display detects that a surface profile of the display has been altered, which causes the display processor to generate a new 2D image of the 3D scene. The effect is that flexing the display allows the user to view the 3D scene from a different perspective. In one embodiment, the different perspective is viewing the object from a different camera position. In another embodiment, the different perspective is provided by generating an exploded view of an assembly of graphics objects.

25 Claims, 7 Drawing Sheets

SYSTEMS AND METHODS FOR VISUALIZING A 3D SCENE USING A FLEXIBLE DISPLAY

BACKGROUND

1. Technical Field

The present disclosure relates generally to display systems and, more specifically, to systems and methods for visualizing a three-dimensional scene using a flexible display.

2. Description of the Related Art

Recently, flexible displays have been developed that allow the display surface to be manipulated by a user into contoured shapes. One example of a flexible display is implemented using organic light emitting diodes (OLED) deposited on a flexible film. Many high-resolution displays require an active matrix control logic (i.e., transistors) to be integrated into the OLED array and are known as active-matrix organic light emitting diode (AMOLED) displays. AMOLED displays include an array of pixels, each pixel being the combination of three or more primary colors, which are fabricated on top of a thin film transistor (TFT) backplane that controls the pixels. The AMOLED may be integrated onto a flexible plastic substrate that allows the display to be bent or manipulated without causing disruption to the picture being displayed.

Three-dimensional (3D) graphics are ubiquitous in today's technological environment. Designers in almost every field utilize computer-aided design (CAD) applications to create new and improved products and buildings. Engineers and machinists commonly view 3D models using two dimensional (2D) displays. However, such systems require a user to manually adjust the model using conventional controls such as a keyboard or a mouse.

Therefore, what are needed in the art are new techniques for exploiting the flexible nature of these innovative displays to visualize 3D scenes.

SUMMARY

One example embodiment of the present disclosure sets forth a method for a 3D object using a flexible display. The method includes the steps of generating a first 2D representation of the 3D object, displaying the first 2D representation on the flexible display, and detecting that a surface profile of the flexible display has been altered. In response to detecting that the surface profile of the flexible display has been altered, the steps further include generating a second 2D representation of the 3D object and displaying the second 2D representation on the flexible display.

Another example embodiment of the present disclosure sets forth a computer readable storage medium containing a program which, when executed, performs an operation for visualizing a 3D object using a flexible display. The operation includes the steps of generating a first 2D representation of the 3D object, displaying the first 2D representation on the flexible display, and detecting that a surface profile of the flexible display has been altered. In response to detecting that the surface profile of the flexible display has been altered, the steps further include generating a second 2D representation of the 3D object and displaying the second 2D representation on the flexible display.

Yet another example embodiment of the present disclosure sets forth a system for visualizing a 3D object using a flexible display. The system includes a flexible display including a sensor configured to measure a surface profile of the flexible display and a processor. The processor is configured to generate a first 2D representation of the 3D object, display the first 2D representation on the flexible display, and detect that the surface profile of the flexible display has been altered. In response to detecting that the surface profile of the flexible display has been altered, the processor is further configured to generate a second 2D representation of the 3D object and display the second 2D representation on the flexible display.

One advantage of the disclosed approach is that the user receives visual feedback from the display based on the manipulation of the display surface. Bending the display will affect the image that the user is viewing. In certain kinds of 3D graphics applications, such capabilities benefit the user by allowing the user to affect the viewing perspective with a simple and intuitive control, namely, the configuration of the display surface. Such techniques do not require a graphical user interfaces overlaid on top of the model that the user is attempting to view, nor do the techniques require the implementation of conventional user interface devices such as a mouse or a touch sensitive display surface.

BRIEF DESCRIPTION OF THE DRAWINGS

So that the manner in which the above recited features can be understood in detail, a more particular description, briefly summarized above, may be had by reference to certain example embodiments, some of which are illustrated in the appended drawings. It is to be noted, however, that the appended drawings illustrate only typical embodiments and are therefore not to be considered limiting the scope of the claims, which may admit to other equally effective embodiments.

For clarity, identical reference numbers have been used, where applicable, to designate identical elements that are common between figures. It is contemplated that features of one example embodiment may be incorporated in other example embodiments without further recitation.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
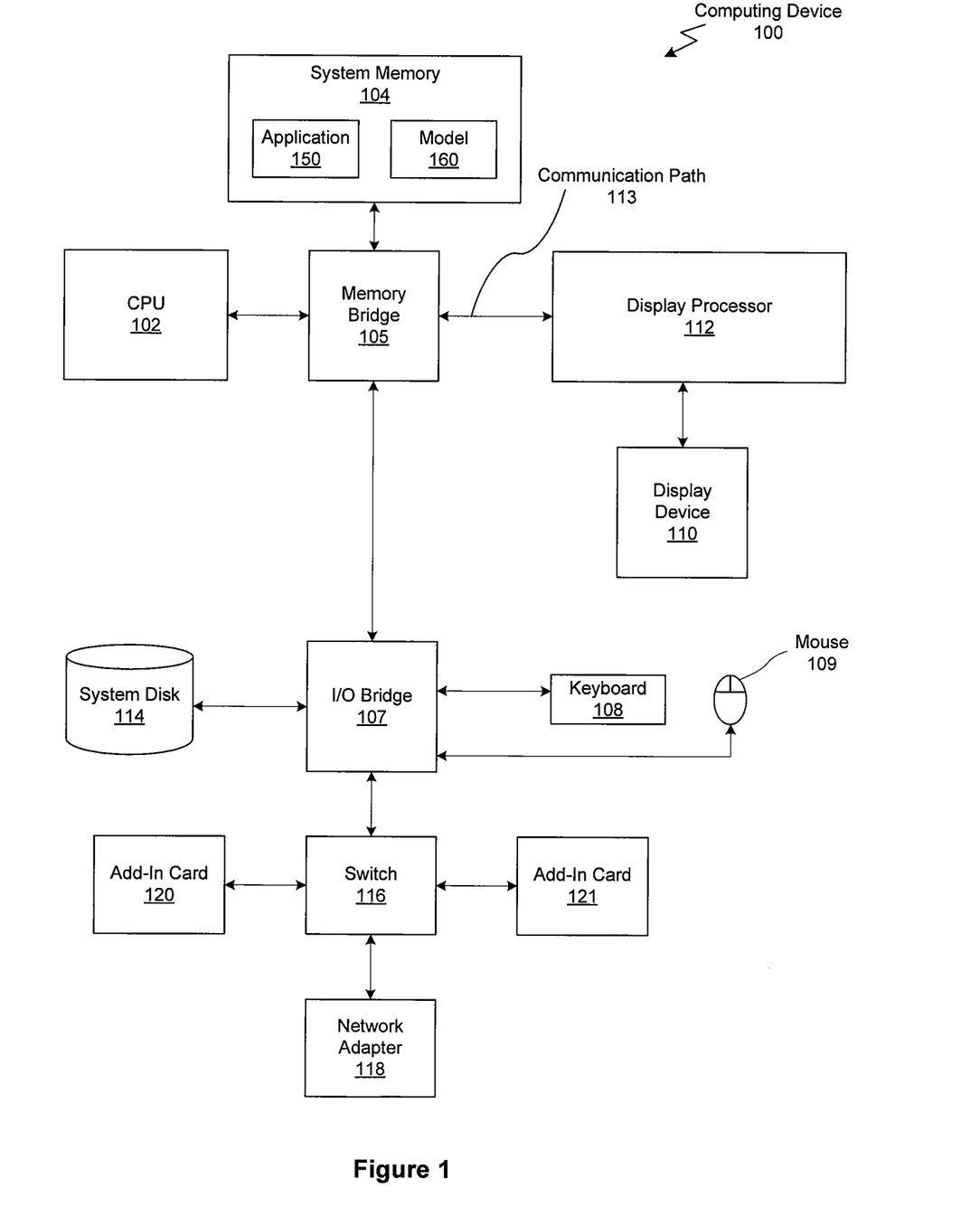
FIG. 1 is a block diagram of a computing device configured to implement one or more aspects of the present disclosure.

FIG. 1 is a block diagram of a computing device 100 configured to implement one or more aspects of the present disclosure. Computing device 100 may be a computer workstation, personal computer, or any other device suitable for practicing one or more embodiments of the present invention. As shown, computing device 100 includes one or more processing units, such as central processing unit (CPU) 102, and a system memory 104 communicating via a bus path that may include a memory bridge 105. CPU 102 includes one or more processing cores, and, in operation, CPU 102 is the master processor of computing device 100, controlling and coordinating operations of other system components. System memory 104 stores software applications and data for execution or processing by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices such as keyboard 108 or mouse 109 and forwards the input to CPU 102 via memory bridge 105. In alternative embodiments, I/O bridge 107 may also be connected to other input devices such as a joystick, digitizer tablets, touch pads, touch screens, still or video cameras, motion sensors, and/or microphones (not shown).

One or more display processors, such as display processor 112, are coupled to memory bridge 105 via a bus or other communication path 113 (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104. Display processor 112 periodically delivers pixels to a display device 110 that may be any conventional CRT or LED monitor. Display processor 112 may be configured to provide display device 110 with either an analog signal or a digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows computing device 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCIe), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to computing device 100, via network adapter 118 or system disk 114. The render farm generates one or more rendered images of the scene using the provided instructions and/or data. These rendered images may be stored on computer-readable media in a digital format and optionally returned to computing device 100 for display.

Alternatively, CPU 102 provides display processor 112 with data and/or instructions defining the desired output images, from which display processor 112 generates the pixel data of one or more output images. The data and/or instructions defining the desired output images can be stored in system memory 104 or a graphics memory within display processor 112. In one embodiment, display processor 112 includes 3D rendering capabilities for generating pixel data for output images from instructions and data defining the geometry, lighting, shading, texturing, motion, and/or camera parameters for a scene. Display processor 112 can further include one or more programmable execution units capable of executing shader programs, tone mapping programs, and the like.

In one embodiment, application 150 and model 160 are stored in system memory 104. Application 150 may be configured to display a 2D representation of model 160 on display 110. Model 160 may be created within application 150 or may be created in a separate application (e.g., a CAD application) that is compatible with application 150. For example, model 160 could define one or more graphics objects that represent a 3D model of a house.

It will be appreciated that the computing device shown herein is illustrative and that variations and modifications are possible. The connection topology, including the number and arrangement of bridges, may be modified as desired. For instance, in some embodiments, system memory 104 may be connected to CPU 102 directly rather than through a bridge, and other devices may communicate with system memory 104 via memory bridge 105 and CPU 102. In other alternative topologies display processor 112 may be connected to I/O bridge 107 or directly to CPU 102, rather than to memory bridge 105. In still other embodiments, I/O bridge 107 and memory bridge 105 may be integrated in a single chip. In addition, the particular components shown herein are optional. For instance, any number of add-in cards or peripheral devices might be supported. In some embodiments, switch 116 is eliminated, and network adapter 118 and add-in cards 120, 121 connect directly to I/O bridge 107.

Visualization Using Flexible Displays

Figure 2A:
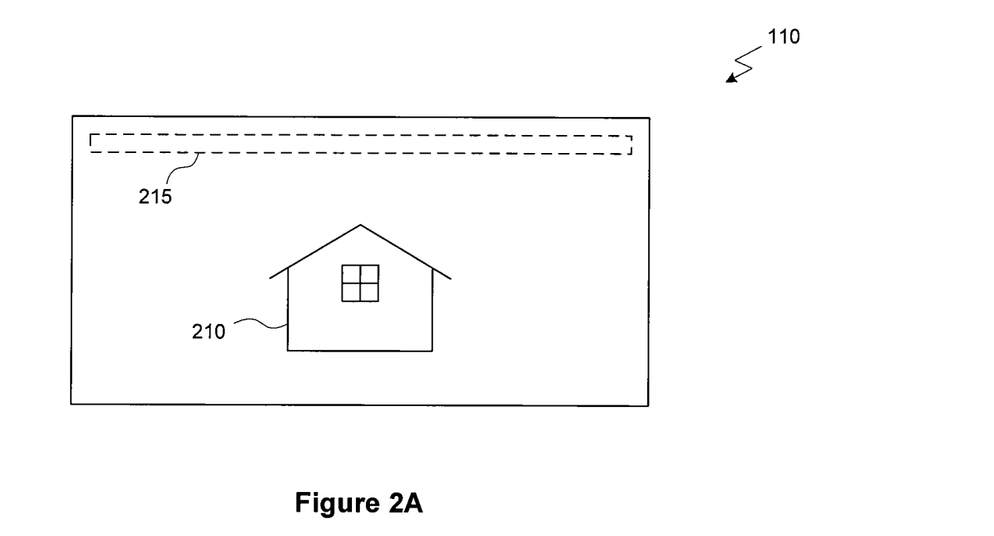
FIGS. 2A and 2B illustrate a 3D scene visualized on a flexible display, according to one example embodiment of the present disclosure.
Figure 2B:
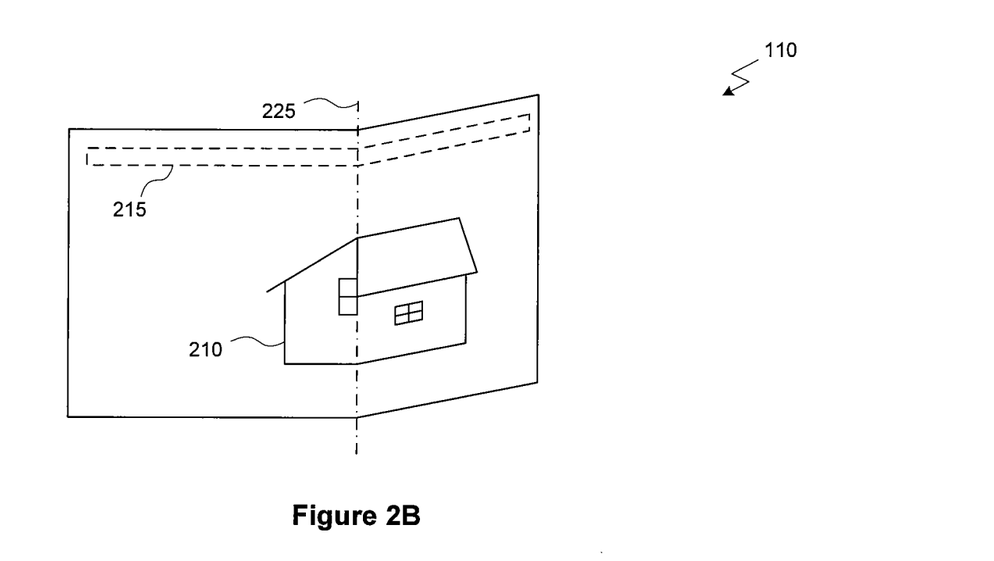

FIGS. 2A and 2B illustrate a 3D scene visualized on a flexible display 110, according to one example embodiment of the present disclosure. As shown in FIG. 2A, the scene displayed on display 110 reflects a front view of an object 210 in a 3D model. The object 210 is a house, for illustrative purposes, but may be any other 3D object represented by vertices, lines, surfaces, or other geometric primitives in 3D space. For example, a programmer designing application 150 may define a model of the house via a CAD program or other illustrator application. The geometric primitives that comprise the house in the CAD program may then be stored as model 160 in system memory and made accessible to application 150. It will be appreciated that model 160 may be stored in any format suitable for defining a 3D graphics object that is compatible with application 150. In alternative embodiments, application 150 may be configured to generate the 3D model 160 internally. In yet other embodiments, a programmer designing application 150 may design the 3D model using an intermediate shading language.

Display 110 includes an integrated sensor 215 that detects whether a surface profile of the flexible display 110 has been altered (i.e., whether a user has flexed the display 110). In one embodiment, sensor 215 is configured to measure the surface profile in one dimension. For example, as shown in FIG. 2A, sensor 215 may be positioned along the horizontal axis of display 110. Sensor 215, therefore, may detect when display 110 is flexed in the horizontal dimension. It will be appreciated that sensor 215 may be any technically feasible sensor capable of detecting flexure of the display surface. For example, sensor 215 may be a fiber optic based sensor, a strain gauge, or any other technically feasible type of sensor. In some embodiments, sensor 215 may comprise two or more individual sensors configured to detect flexure at multiple locations in display 110. For example, a combination of a plurality of fiber optic sensors of various lengths arranged in a specific configuration relative to the display surface may be used to determine the amount of flexure of the display surface over the length of the sensor. In alternative embodiments, sensor 215 may be configured to detect bending in two or more dimensions. For example, a first sensor may detect bending in a horizontal dimension, and a second sensor may detect bending in a vertical dimension.

As shown in FIG. 2B, when the display 110 is flexed along the centerline 225, the projected image of the 3D object 210 is adjusted. In one embodiment, as the right side of display 110 is bent backwards such that the obtuse angle between the left and right side decreases, the projection of object 210 on the right side of display 110 is adjusted so that the user may view a right side view of object 210 on the right portion of the display 110 in addition to a front view of object 210 on the left portion of the display 110. Although FIG. 2B shows that the right side of display 110 is flat when a force is applied to cause the display to bend, alternatively display 110 may have a constant radius of curvature resulting from forces applied at the edges of display 110. Therefore, in FIG. 2B, centerline 225 is merely conceptual as a separation boundary between two portions of the display surface, a left portion that shows the original projection based on a first camera position and a right portion that shows a new projection based on a second camera position. In a display with a constant radius of curvature, the centerline 225 may be located at a horizontal position such that the left portion and the right portion are not equal.

Prior to sensor 215 detecting that the display 110 has been flexed, display processor 112 receives the data specified by model 160 from application 150. Application 150 may transmit the data to display processor 112 via a driver executing on CPU 102. The model 160 defines object 210 and enables display processor 112 to generate a 2D image of the object 210 for display, as is known in the art. For example, using a particular camera position, the display processor 112 may use a non-linear ray-tracing technique to convert the representation of the image from a 3D model space to a 2D image space. Alternatively, the display processor 112 may rasterize the object 210 and then perform pixel shading operations to generate the 2D image.

In response to sensor 215 detecting that display 110 is flexed, the image being displayed on display 110 is changed by display processor 112. Display 110 may send a signal to display processor 112 that indicates display 110 has been flexed by a user. As display processor 112 receives the signal, display processor 112 adjusts the algorithm for generating the 2D image of the object 210 for different portions of display 110. For example, display processor 112 may generate a first portion of the image using a camera position that provides a front view of the object 210 in the left portion of display 110. In addition, display processor 112 may generate a second portion of the image using a different camera position, which causes a different perspective of object 210 to be displayed on the right portion of display 110. Thus, the right side of display 110 will appear to "wrap" around the right side of the object 210 when the display 110 is flexed.

In some embodiments, sensor 215 has the capability to detect the magnitude of the amount of flexure of the display surface. In such embodiments, sensor 215 not only detects whether the display 110 is flexed by a user, but how much the user has flexed the display. In one embodiment, display processor 112 is configured to change from one view to another view once the magnitude of the amount of flexure is greater than a threshold value. When the amount of flexure is greater than the threshold value, the image being displayed will change from a first image to a second image, using a fixed camera position to generate the second portion of the second image. In other words, flexing the display 110 past a certain threshold value will cause the first image to toggle to a second image. In another embodiment, display processor 112 is configured to generate the second image based on the relative amount of flexure of the display 110. By flexing the display 110 slightly, a user will see a slight change in perspective in the second portion of the image. As the user continues to flex the display 110, the difference in the two perspectives increases to give a viewer the experience that the display surface is bending around the object 210. For example, a front perspective view of object 210 may correspond to zero flex of display 110 and a right side perspective view of object 210 may correspond to a maximum amount of flex of display 110. Display processor 112 may adjust the camera position for generating the 2D image for the second portion of the display 110 by an amount that corresponding to the amount of detected flexure.

Figure 3A:
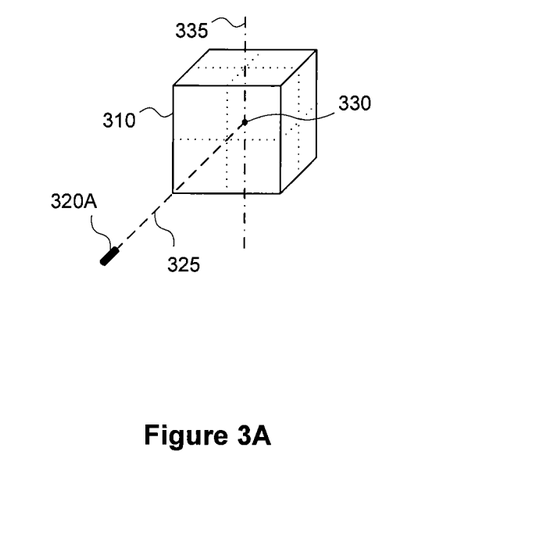
FIGS. 3A and 3B are conceptual illustrations of using different camera positions for generating 2D representations of a 3D scene, according to one example embodiment of the present disclosure.
Figure 3B:
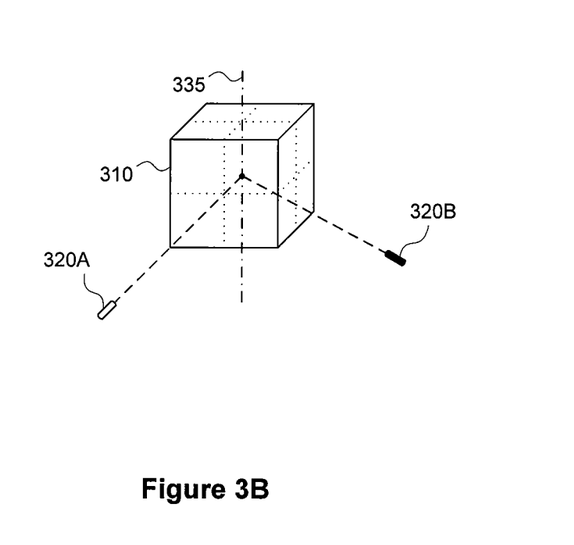

FIGS. 3A and 3B are conceptual illustrations of using different camera positions for generating 2D representations of a 3D scene, according to one example embodiment of the present disclosure. FIG. 3A shows a simplified representation (e.g., a cube) of an object 310. The object 310 has a center-of-mass 330 that, in one embodiment, may correspond to a point around which the camera position is rotated. Rotation axis 335 passes through the center-of-mass 330 of object 310. It will be appreciated that the axis chosen to transform the camera position for generating the second portion of the 2D image is arbitrary and is not required to be located at a position associated with the object 310.

A first camera position 320A is used to generate a first portion of the 2D image. Based on the first camera position 320A, display processor 112 generates a square in the 2D image, which corresponds to a front view of object 310. FIG. 3B shows an adjusted camera position 320B that is used to generate a second portion of the 2D image. As shown, camera position 320B has been rotated around axis 335 by approximately 45°. The pixels of the 2D image that correspond to the second portion are generated as a result of a projection based on the second camera position 320B.

Referring back to FIG. 2B, the image displayed in the left portion of display 110 corresponds to pixels generated based on camera position 320A of FIG. 3B, and the image displayed in the right portion of display 110 corresponds to pixels generated based on camera position 320B of FIG. 3B. In comparison, referring now back to FIG. 2A before display 110 has been flexed, all pixels of the image are generated using a projection based on camera position 320A of FIG. 3A.

Referring again to FIGS. 3A and 3B, in one embodiment, the amount of rotation around axis 335 from a first camera position 320A to a second camera position 320B may be preset to provide a specific vantage point around the object 310 (e.g., such as an orthogonal projection). In an alternative embodiment, the amount of rotation may be adjusted dynamically based on the amount of flexure of display 110 detected by sensor 215.

Figure 4A:
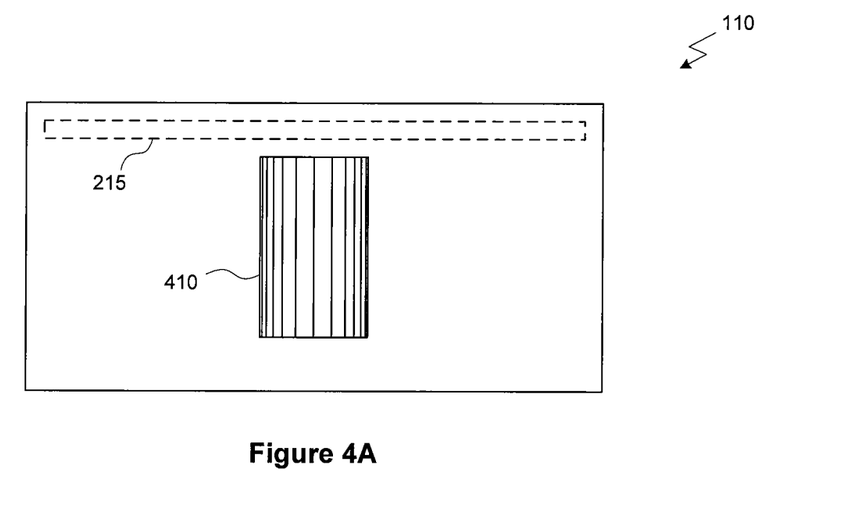
FIGS. 4A and 4B illustrate one technique for viewing a 3D object via a flexible display, according to another example embodiment of the present disclosure.
Figure 4B:
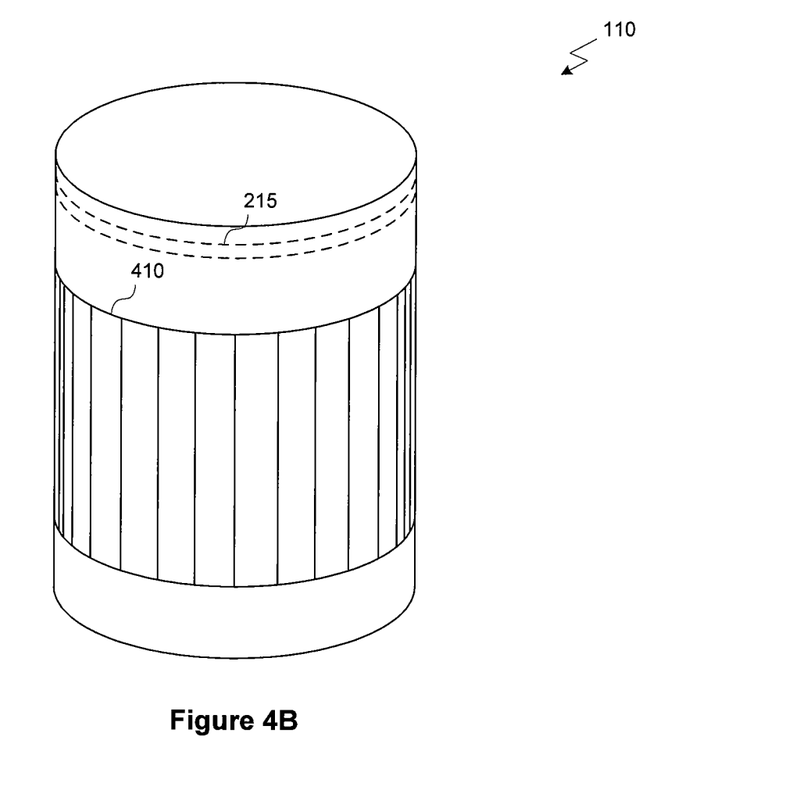

FIGS. 4A and 4B illustrate one technique for viewing a 3D object 410 via a flexible display 110, according to another example embodiment of the present disclosure. As shown in FIG. 4A, object 410 is cylindrically shaped. The 2D image displayed in FIG. 4A only provides a user with a perspective from a single camera position. In one embodiment, display processor 112 causes the 2D image shown on display 110 to change when sensor 215 detects that a user has manipulated the surface profile of the display 110 into a cylinder. As shown in FIG. 4B, the projection of object 410 onto the surface of display 110 allows a user to view the object 410 from any perspective 360 degrees around a central axis of object 410.

In one embodiment, display processor 112 calculates a new camera position for each column of pixels in a 2D image generated based on object 410, where the camera position is directed towards the center-of-mass of object 410. Display processor 112 then determines a shaded color value for each of the pixels in the column of the 2D image before generating a new camera position for the next column of pixels. By this method, the resulting 2D image displayed on display 110 will look like the object 410 from any perspective surrounding the object 410.

Figure 5A:
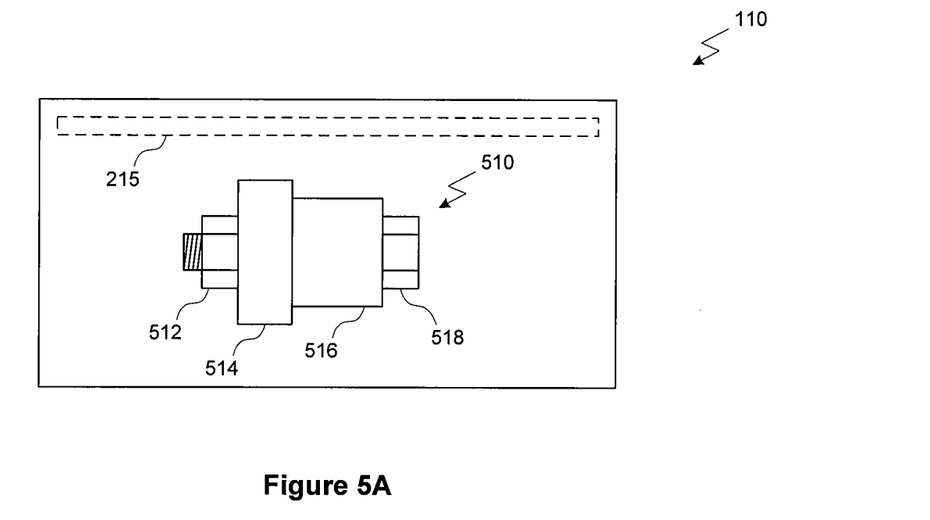
FIGS. 5A and 5B illustrate another technique for viewing an assembly of 3D objects via a flexible display, according to another example embodiment of the present disclosure.
Figure 5B:
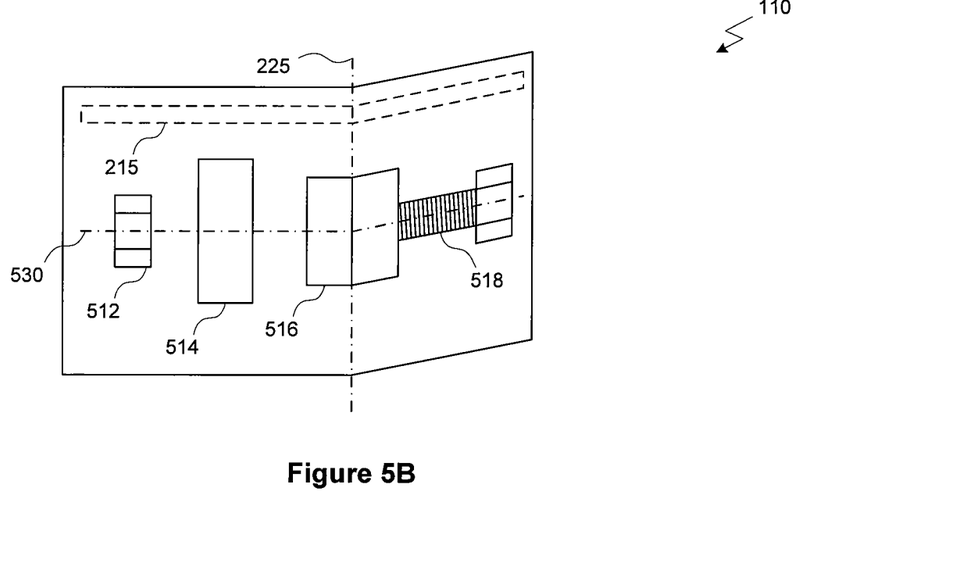

FIGS. 5A and 5B illustrate another technique for viewing an assembly 510 of 3D objects via a flexible display 110, according to another example embodiment of the present disclosure. FIG. 5A shows the assembly 510 from a front perspective view. The assembly 510 includes a first part 514 and a second part 516 bolted together with a bolt 518 and a nut 512. In one embodiment, when sensor 215 determines that display 110 is flexed, the view of the assembly 510 is changed to an exploded view.

As shown in FIG. 5B, as display 110 is flexed along centerline 225, the 2D image showing the assembly changes to an exploded view. The model 160 defining the objects (512, 514, etc.) is adjusted to move the objects apart along an axis 530 that is aligned in the same dimension as sensor 215. For example, sensor 215 determines that display 110 is flexed relative to a horizontal dimension, and the objects of assembly 510 are moved apart relative to each other along the horizontal dimension. In another embodiment, the relative motion of the objects may be pre-configured along an axis that is not related to the alignment of sensor 215. For example, a programmer may create a configuration of the 3D objects in the assembly 510 corresponding to an exploded view that is displayed when display 110 is flexed. In this manner, the programmer may determine the exact location of each object in the assembly 510 as viewed in the exploded state.

Figure 6A:
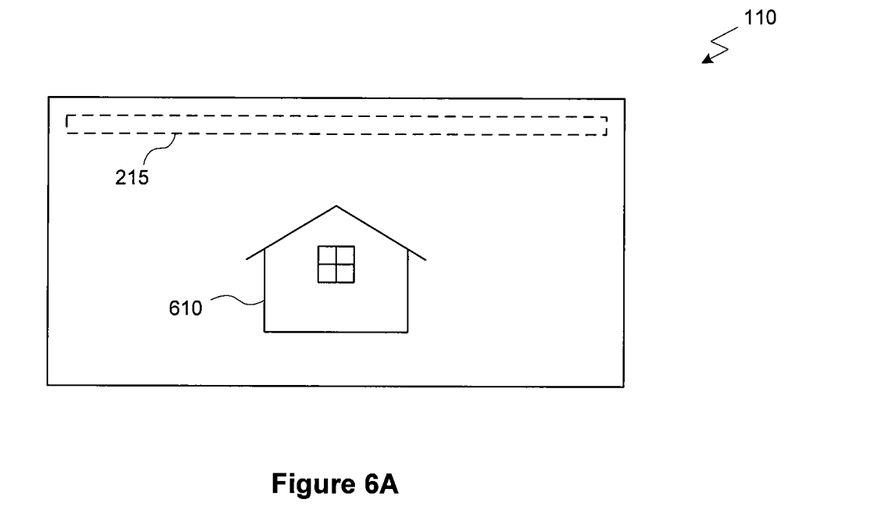
FIGS. 6A and 6B illustrate yet another technique for viewing a 3D object via a flexible display, according to yet another example embodiment of the present disclosure.
Figure 6B:
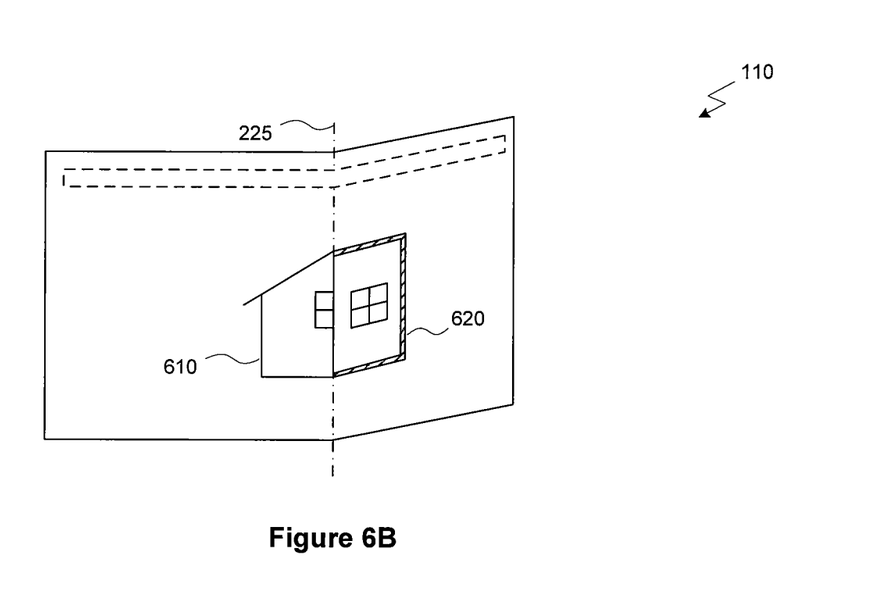

FIGS. 6A and 6B illustrate yet another technique for viewing a 3D object 610 via a flexible display 110, according to another example embodiment of the present disclosure. Object 610, for illustration purposes, represents a 3D model of a building. As shown in FIG. 6A, a 2D image is displayed on display 110 that represents a front view of object 610. As the display 110 is flexed, a first portion of the 2D image continues to show the front view of object 610, and a second portion of the 2D image is adjusted to show a sectional view of object 610.

As shown in FIG. 6B, the first portion of the 2D image to the left of centerline 225 shows the front view of object 610. In contrast, the second portion of the 2D image to the right of centerline 225 shows a sectional view of object 610 corresponding to a cutting plane that corresponds to the boundary between the first portion and the second portion of the 2D image. In alternative embodiments, the sectional view may be generated based on a different cutting plane and/or a different camera position orientation. For example, the sectional view of FIG. 6B may be from the front view orientation such that the cutting plane is normal to the vector from the camera position to the center-of-mass of object 610.

In yet other embodiments, flexing display 110 may cause the entire 2D image to switch from a front view to a sectional view. The cutting plane used for the sectional view may be pre-configured at a particular location relative to the center-of-mass of object 610 or may be calculated based on the amount of flexure (i.e., the current surface profile) detected by sensor 215. If the position of the cutting plane is dynamically adjusted based on the amount of flexure, a user may view the interior volume of the object 610 from front to back by simply flexing the display.

It will be appreciated that, in general, flexing display 110 results in changing the image displayed on display 110 from one view to a second alternate view, or causing some type of "behavioral response" in the scene. For example, flexing the display 110 may change the position of a virtual camera, causing the scene to "zoom in" or "zoom out". Another example may be to change the transparency of an object in the 3D scene from opaque to partially or fully translucent.

In yet other embodiments, flexing the display 110 may not change the 2D image of the 3D scene, but may instead overlay a text or graphic on the 2D image. For example, metadata related to the 3D scene may be displayed over the 2D image when a user flexes the display 110. In alternate embodiments, various other mappings from the 3D scene to the 2D image may be implemented, such as by implementing various non-linear projection techniques. In yet additional alternate embodiments, flexing the display may cause the camera position to "pan" to the right or left in the 3D model, generating a moving multi-perspective landscape.

In some embodiments, the 2D images of the 3D scene may be selected from multiple 2D representations of the 3D scene, each 2D representation associated with a different camera perspective. In one embodiment, flexing the display 110 simply toggles which pre-stored 2D representation of the model to display. In other embodiments, flexing the display 110 causes a new 2D image to be generated based on the multiple 2D representations. For example, a plurality of photos may be taken to generate a panorama of a single scene, the panorama showing portions of the scene that could not be captured using a single shot.

Figure 7:
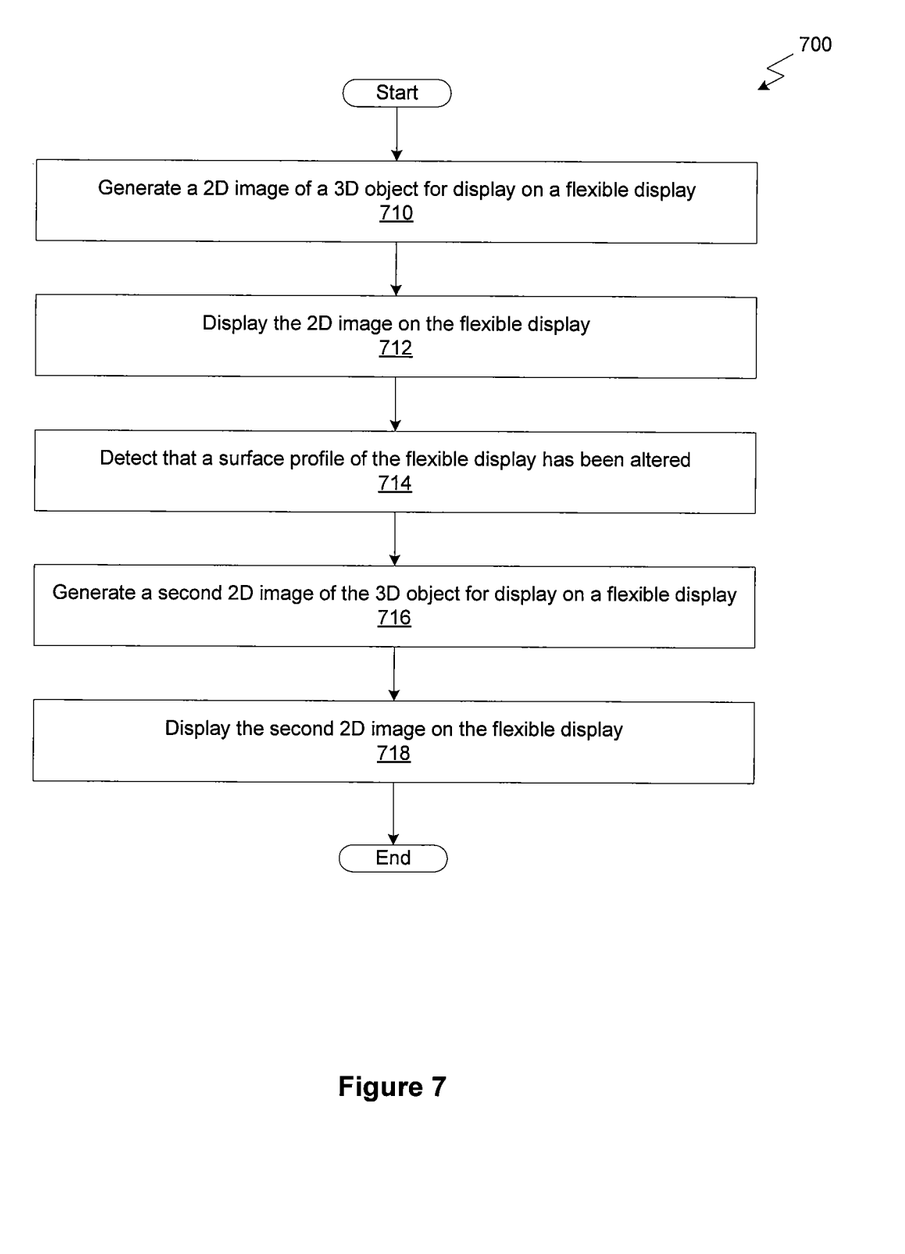
FIG. 7 is a flowchart of method steps for generating visualizing a 3D scene on a flexible display, according to one example embodiment of the present disclosure.

FIG. 7 is a flowchart of method steps 700 for generating visualizing a 3D scene on a flexible display 110, according to one example embodiment of the present disclosure. Although the method steps are described in conjunction with the systems of FIGS. 1-6, persons skilled in the art will understand that any system configured to perform the method steps, in any order, is within the scope of the disclosure.

The method 700 begins at step 710, where display processor 112 generates a 2D representation of a 3D object 210. In one embodiment, display processor 112 receives graphics data and instructions from a driver executing on CPU 102. The instructions may be configured to implement a non-linear ray-tracing algorithm on display processor 112. Display processor 112 receives the graphics data from the driver and processes the graphics data to generate an image for display that reflects one projection of the 3D object 210 from a particular camera position. In alternative embodiments, display processor 112 may implement different algorithms for generating the 2D image. At step 712, display processor 112 causes the 2D representation to be displayed on flexible display 110. For example, display 110 is made to display an image of the 3D object 210 from a front perspective view.

At step 714, display processor 112 detects that a surface profile of the flexible display 110 has been altered. In one embodiment, a sensor 215 is configured to detect whether display 110 has been flexed. Display 110 may transmit a signal to display processor 112 when sensor 215 detects that display 110 has been flexed by at least a threshold amount. In another embodiment, display 110 periodically transmits a value to display processor 112 that reflects the amount of flexure of display 110 measured by sensor 215. At step 716, in response to detecting that the surface profile of the flexible display 110 has been altered, display processor 112 generates a second 2D representation of the 3D object 210. Example embodiments of the first 2D representation and the second 2D representation include corresponding front view and side view, front view and sectional view, assembly view and exploded view, and front view and 360 degree cylindrical view. At step 718, display processor 112 causes the second 2D representation to be displayed on display 110. In one embodiment, the second 2D representation is overlaid on top of the first 2D representation so that one portion of the display surface reflects the first 2D representation and another portion of the display surface reflects the second 2D representation. In alternative embodiments, the second 2D representation may be displayed on the entire display surface.

In sum, the present application describes a system and method for visualizing a 3D scene using a flexible display. The 3D scene reflects a model of graphics objects, where each graphics object is represented by 3D primitives such as vertices, lines, or surfaces. A display processor generates a 2D image of the 3D scene using various graphics rendering techniques such as non-linear ray-tracing algorithms. A sensor associated with the flexible display detects that the display surface is being flexed by a user, which causes the display processor to generate a new 2D image of the 3D scene. The effect is that flexing the display allows the user to view the 3D scene from a different perspective. In one embodiment, the different perspective is viewing the object from a different camera position. In another embodiment, the different perspective is provided by generating an exploded view of an assembly of graphics objects.

While the foregoing is directed to certain example embodiments, other and further embodiments may be devised without departing from the basic scope thereof. For example, aspects of the embodiments may be implemented in hardware or software or in a combination of hardware and software. One embodiment may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the aforementioned functions, are included as example embodiments.

In view of the foregoing, the scope of the present disclosure is determined by the claims that follow.

What is claimed is:

1. A method for visualizing a three dimensional (3D) object using a flexible display, the method comprising:
generating a first two dimensional (2D) representation that corresponds to a first perspective of the 3D object;
displaying the first 2D representation on the flexible display;
detecting that a surface profile of the flexible display has been altered; and
in response to the detecting, generating a second 2D representation that corresponds to a second perspective of the 3D object, and displaying the first 2D representation on a first portion of the flexible display while displaying the second 2D representation on a second portion of the flexible display.

2. The method of claim 1, wherein the first 2D representation and the second 2D representation are generated via a non-linear ray-tracing algorithm.

3. The method of claim 1, wherein detecting that the surface profile of the flexible display has been altered comprises receiving a signal from a fiber optic sensor.

4. The method of claim 1, wherein the first 2D representation comprises a front view of the 3D object, and the second 2D representation comprises a side view of the 3D object.

5. The method of claim 1, wherein the first 2D representation comprises a front view of the 3D object, and the second 2D representation comprises a sectional view of the 3D object.

6. The method of claim 1, wherein the first 2D representation comprises a front view of the 3D object, and the second 2D representation comprises at least a portion of a 360 degree view of the 3D object, and wherein detecting that the surface profile of the flexible display has been altered comprises detecting that the surface profile has been substantially formed into a cylinder.

7. The method of claim 1, wherein the surface profile of the flexible display is altered along a boundary line, the first portion of the flexible display is located on a first side of the boundary line, and the second portion of the flexible display is located on a second side of the boundary line.

8. The method of claim 7, wherein the first 2D representation and the second 2D representation form a substantially continuous image of the 3D object across the boundary line.

9. The method of claim 1, further comprising:
detecting an amount of flexure of the flexible display; and
in response to detecting the amount of flexure, generating a third 2D representation that corresponds to a third perspective of the 3D object, and displaying the first 2D representation on the first portion of the flexible display while displaying the third 2D representation on the second portion of the flexible display, wherein the third perspective is based on the amount of flexure.

10. A non-transitory computer-readable storage medium containing a program which, when executed, performs an operation for visualizing a three dimensional (3D) object using a flexible display, the operation comprising:
generating a first two dimensional (2D) representation that corresponds to a first perspective of the 3D object;
displaying the first 2D representation on the flexible display;
detecting that a surface profile of the flexible display has been altered; and
in response to the detecting, generating a second 2D representation that corresponds to a second perspective of the 3D object, and displaying the first 2D representation on a first portion of the flexible display while displaying the second 2D representation on a second portion of the flexible display.

11. The non-transitory computer-readable storage medium of claim 10, wherein the first 2D representation and the second 2D representation are generated via a non-linear ray-tracing algorithm.

12. The non-transitory computer-readable storage medium of claim 10, wherein detecting that the surface profile of the flexible display has been altered comprises receiving a signal from a fiber optic sensor.

13. The non-transitory computer-readable storage medium of claim 10, wherein the first 2D representation comprises a front view of the 3D object and the second 2D representation comprises a side view of the 3D object.

14. The non-transitory computer-readable storage medium of claim 10, wherein the first 2D representation comprises a front view of the 3D object and the second 2D representation comprises a sectional view of the 3D object.

15. The non-transitory computer-readable storage medium of claim 10, wherein the first 2D representation comprises a front view of the 3D object and the second 2D representation comprises at least a portion of a 360 degree view of the 3D object, and wherein detecting that the surface profile of the flexible display has been altered comprises detecting that the surface profile is substantially formed into a cylinder.

16. A system for visualizing a three dimensional (3D) object, the system comprising:
a flexible display including a sensor configured to measure a surface profile of the flexible display; and
a processor configured to:
generate a first two dimensional (2D) representation that corresponds to a first perspective of the 3D object,
display the first 2D representation on the flexible display,
detect that the surface profile of the flexible display has been altered, and
in response to the detecting, generate a second 2D representation that corresponds to a second perspective of the 3D object, and displaying the first 2D representation on a first portion of the flexible display while displaying the second 2D representation on a second portion of the flexible display.

17. The system of claim 16, wherein the processor generates the first 2D representation and the second 2D representation via a non-linear ray-tracing algorithm.

18. The system of claim 16, wherein the sensor comprises a fiber optic sensor.

19. The system of claim 16, wherein the processor is a graphics processing unit, the system further comprising a central processing unit coupled to the graphics processing unit.

20. The system of claim 16, wherein the first 2D representation comprises a front view of the 3D object and the second 2D representation comprises a side view of the 3D object.

21. The system of claim 16, wherein the first 2D representation comprises a front view of the 3D object and the second 2D representation comprises a sectional view of the 3D object.

22. A method for adjusting a scene displayed on a flexible surface, the method comprising:
generating a first representation that corresponds to a first perspective of the scene;
displaying the first representation on the flexible surface;
detecting that a surface profile of the flexible surface has been altered; and
in response to the detecting, generating a second representation that corresponds to a second perspective of the scene, and displaying the first representation on a first portion of the flexible display while displaying the second representation on a second portion of the flexible surface.

23. The method of claim 22, wherein a plurality of images of the scene are generated prior to detecting that the surface profile has been altered, and wherein displaying the first representation or the second representation comprises selecting an image from the plurality of images based on the surface profile of the flexible surface.

24. A system for adjusting a scene displayed on a flexible surface, the method comprising:
a display device including a sensor configured to measure a surface profile of the flexible surface of the display device; and
a processor configured to:
generate a first representation that corresponds to a first perspective of the scene,
display the first representation on the flexible surface,
detect that the surface profile of the flexible surface has been altered, and
in response to the detecting, generate a second representation that corresponds to a second perspective of the scene, and displaying the first representation on a first portion of the flexible display while displaying the second representation on a second portion of the flexible surface.

25. The system of claim 24, wherein a plurality of images of the scene are generated prior to detecting that the surface profile has been altered, and wherein displaying the first representation or the second representation comprises selecting an image from the plurality of images based on the surface profile of the flexible surface.

* * * * *